US011826901B2

(12) United States Patent
Son et al.

(10) Patent No.: US 11,826,901 B2
(45) Date of Patent: Nov. 28, 2023

(54) ELECTRONIC DEVICE, AND METHOD FOR SENSING STATE THEREOF

(71) Applicant: Samsung Electronics Co., Ltd., Suwon-si (KR)

(72) Inventors: Hyeongrak Son, Suwon-si (KR); Kihoon Kang, Suwon-si (KR); Taekeun Kim, Suwon-si (KR); Hyungkil Park, Suwon-si (KR); Kihun Eom, Suwon-si (KR); Jeongmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 17/289,098

(22) PCT Filed: Nov. 26, 2019

(86) PCT No.: PCT/KR2019/016348
§ 371 (c)(1),
(2) Date: Apr. 27, 2021

(87) PCT Pub. No.: WO2020/111718
PCT Pub. Date: Jun. 4, 2020

(65) Prior Publication Data
US 2022/0001550 A1 Jan. 6, 2022

(30) Foreign Application Priority Data

Nov. 28, 2018 (KR) .......................... 10-2018-0149896

(51) Int. Cl.
*B25J 13/08* (2006.01)
*G06T 7/73* (2017.01)

(52) U.S. Cl.
CPC ............... *B25J 13/08* (2013.01); *G06T 7/75* (2017.01)

(58) Field of Classification Search
CPC ..................................................... B25J 13/08
See application file for complete search history.

(56) References Cited

U.S. PATENT DOCUMENTS 6,864,790 B2  3/2005 Nishihara et al.
7,180,425 B2 *  2/2007 Yuasa ..................... G01P 1/127
                                                    42/70.07
(Continued)

FOREIGN PATENT DOCUMENTS

EP    1 416 284 A1    5/2004
JP    2006-086651 A    3/2006
(Continued)

*Primary Examiner* — Travis R Hunnings
(74) *Attorney, Agent, or Firm* — Jefferson IP Law, LLP

(57) ABSTRACT

Various embodiments of the present invention relate to an electronic device and a method for sensing a state thereof, and the electronic device may include a processor, and a sensor including a first interrupt pin and a second interrupt pin operatively connected with the processor, and configured to detect a movement of the electronic device, wherein the sensor may be configured to, when detecting a free fall of the electronic device, transmit a first designated signal to the processor using the first interrupt pin, and when detecting an impact state of the electronic device, transmit a second designated signal to the processor using the second interrupt pin. Other various embodiments are also possible.

20 Claims, 14 Drawing Sheets

(56) References Cited

U.S. PATENT DOCUMENTS

| | | | |
|---|---|---|---|
| 7,986,233 B2 * | 7/2011 | Wehrenberg | G08B 13/1436 340/568.1 |
| 8,549,892 B2 | 10/2013 | Weber et al. | |
| 9,501,127 B2 | 11/2016 | Oh et al. | |
| 2003/0151517 A1 * | 8/2003 | Nishihara | G01P 15/0922 340/665 |
| 2007/0030159 A1 * | 2/2007 | Stoev | G01P 15/18 340/669 |
| 2008/0129526 A1 * | 6/2008 | Rizzo Piazza Roncoroni | G11B 19/043 |
| 2008/0174444 A1 * | 7/2008 | Noda | G01P 15/08 340/669 |
| 2008/0218366 A1 * | 9/2008 | Chen | G01P 15/00 340/669 |
| 2008/0234935 A1 * | 9/2008 | Wolf | G01C 19/02 701/472 |
| 2009/0034114 A1 | 2/2009 | Kuroki et al. | |
| 2009/0153341 A1 * | 6/2009 | Spalink | G06F 1/1694 340/669 |
| 2010/0290145 A1 * | 11/2010 | Ahmad | G11B 21/12 360/97.12 |
| 2010/0290149 A1 * | 11/2010 | Ahmad | G11B 21/12 360/71 |
| 2011/0215940 A1 * | 9/2011 | Bartholomeyczik | G01P 15/0891 340/669 |
| 2018/0070897 A1 * | 3/2018 | Kravis | A61B 6/467 |
| 2018/0070898 A1 * | 3/2018 | Kravis | A61B 6/4233 |
| 2018/0070909 A1 * | 3/2018 | Kravis | G06F 1/32 |
| 2019/0220076 A1 | 7/2019 | Heo et al. | |
| 2020/0158752 A1 * | 5/2020 | Eom | H04M 1/724 |

FOREIGN PATENT DOCUMENTS

| | | |
|---|---|---|
| JP | 2007-115309 A | 5/2007 |
| JP | 2008-232631 A | 10/2008 |
| JP | 2010-038839 A | 2/2010 |
| JP | 2014-215184 A | 11/2014 |
| JP | 2014-232027 A | 12/2014 |
| JP | 6186888 B2 | 8/2017 |
| KR | 10-0723494 B1 | 6/2007 |
| KR | 10-0751860 B1 | 8/2007 |
| KR | 10-2012-0139872 A | 12/2012 |
| KR | 10-2014-0027893 A | 3/2014 |
| KR | 10-2014-0030033 A | 3/2014 |

* cited by examiner

ELECTRONIC DEVICE, AND METHOD FOR SENSING STATE THEREOF

TECHNICAL FIELD

Various embodiments of the present invention relate to an electronic device and a method for sensing a state thereof.

BACKGROUND ART

Electronic devices (e.g., mobile terminals, smart phones, or wearable devices) may provide various functions. For example, in addition to a basic voice communication function, a smart phone may provide various functions such as a short-range wireless communication (e.g., Bluetooth, Wi-Fi, or near field communication (NFC)) function, a mobile communication ($3^{rd}$ generation (3G), 4G, 5G, etc.) function, a music or video playback function, a photographing function, or a navigation function.

The electronic devices may include parts (e.g., sensors) for determining various states (or conditions) (e.g., fall, or impact) which may occur inside or outside the electronic device.

DISCLOSURE OF INVENTION

Technical Problem

In general, an electronic device determines a state of the electronic device by periodically reading raw data from a sensor. As such, to read the sensor's raw data, the electronic device has a problem that a processor operates relatively frequently and increases current consumption. For example, the processor must periodically wake up from an inactive state (e.g., sleep) to read the raw data.

In various embodiments of the present invention, the sensor may monitor the state (e.g., occurrence of free fall and/or impact) of the electronic device, and if detecting a designated state, transmit it to the processor through an interrupt pin included in the sensor.

In addition, various embodiments of the present invention may store in a memory and/or provide to a user various information related to the detected state.

Solution to Problem

An electronic device according to various embodiments of the present invention may include, for example, a processor and a first interrupt pin and a second interrupt pin operatively connected to the processor, and a sensor configured to detect a movement of the electronic device, wherein the sensor may be configured to transmit, when detecting a free fall of the electronic device, a first designated signal to the processor using the first interrupt pin, and transmit, when detecting an impact state for the electronic device, a second designated signal to the processor using the second interrupt pin.

An electronic device according to various embodiments of the present invention may include, for example, a memory, a sensor including a first interrupt pin and a second interrupt pin, and at least one processor operatively connected to the memory and the sensor, wherein the at least one processor may be configured to receive a first designated signal indicating a free fall of the electronic device through the first interrupt pin or a second designated signal indicating an impact of the electronic device through the second interrupt pin, determine a state of the electronic device based on at least one of the first designated signal and the second designated signal, and perform at least one of storing information related to the determined state in the memory or notifying to a user.

An electronic device according to various embodiments of the present invention may include, for example, a first sensor including a first interrupt pin and a second interrupt pin, a second sensor, and at least one processor operatively connected to the first sensor and the second sensor, wherein the at least one processor may be configured to receive at least one of a first designated signal indicating a free fall of the electronic device through the first interrupt pin or a second designated signal indicating an impact within a first impact range through the second interrupt pin, and receive a fourth designated signal indicating an impact within a second impact range which is greater than the first impact range from the second sensor.

A method of detecting a state of an electronic device including a sensor which includes a first interrupt pin and a second interrupt pin according to various embodiments of the present invention may include receiving at least one of a first designated signal indicating a free fall of the electronic device through the first interrupt pin or a second designated signal indicating an impact of the electronic device through the second interrupt pin, determining a state of the electronic device based on at least one of the first designated signal and the second designated signal, and performing at least one of storing information related to the determined state in a memory of the electronic device or notifying to a user.

Advantageous Effects of Invention

An electronic device according to various embodiments of the present invention may reduce current consumption as a processor does not periodically operate to read sensor's raw data, and operates only if receiving an interrupt from a sensor. In addition, various embodiments of the present invention may accurately recognize various states related to the electronic device, and provide related information to a user.

BEST MODE FOR CARRYING OUT THE INVENTION

Figure 1:
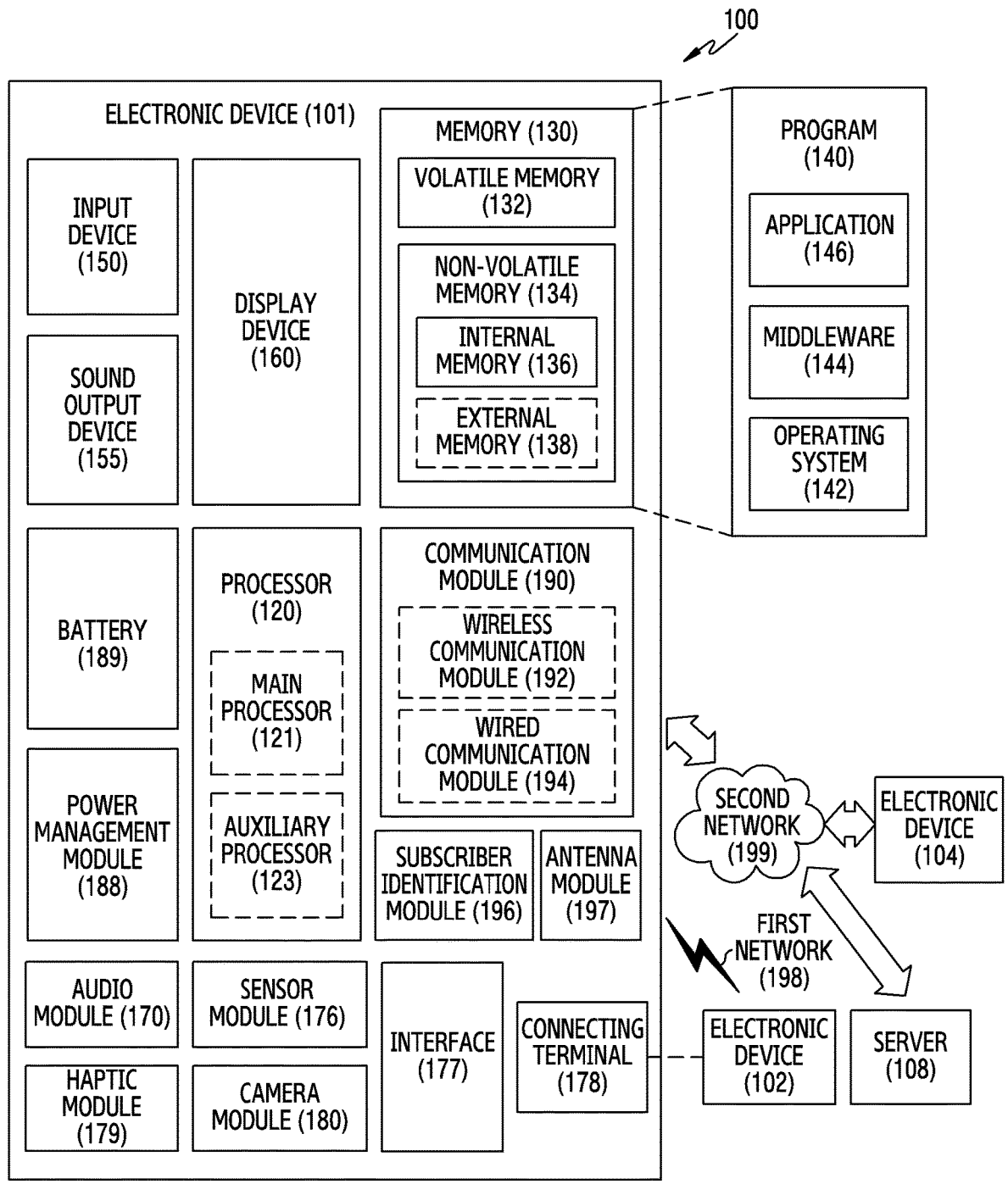
FIG. 1 is a block diagram of an electronic device in a network environment, according to various embodiments of the present invention.

Hereinafter, various embodiments of the present invention will be described with reference to the accompanying drawings. Although the present document illustrates specific embodiments in the drawings and describes related details, it is not intended to limit various embodiments of the present invention to specific forms. For example, it is obvious to those skilled in the art to which the present invention pertains that the embodiments of the present invention may be variously changed.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
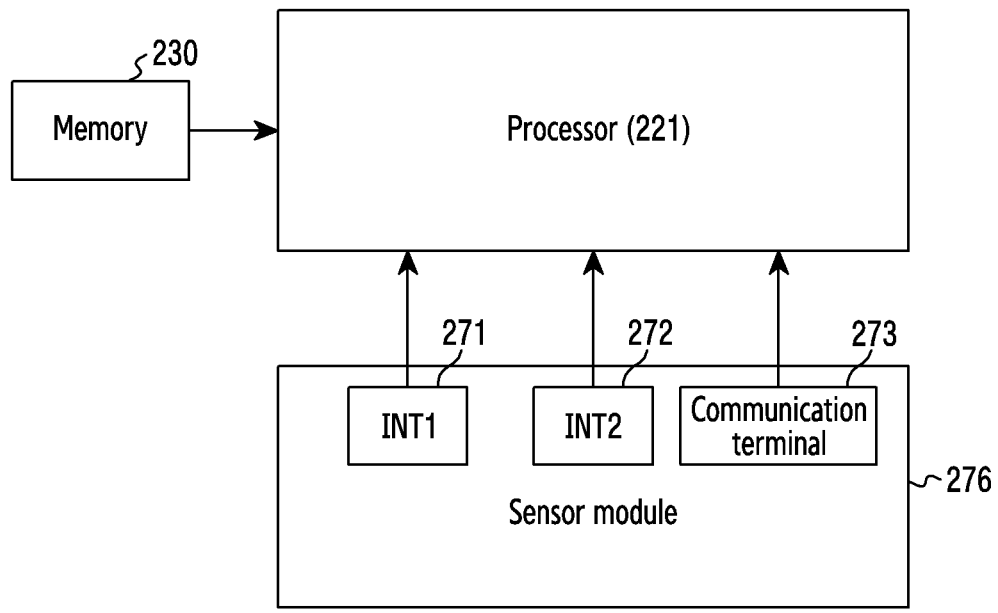
FIG. 2A is a block diagram of an electronic device according to an embodiment of the present invention.
Figure 2B:
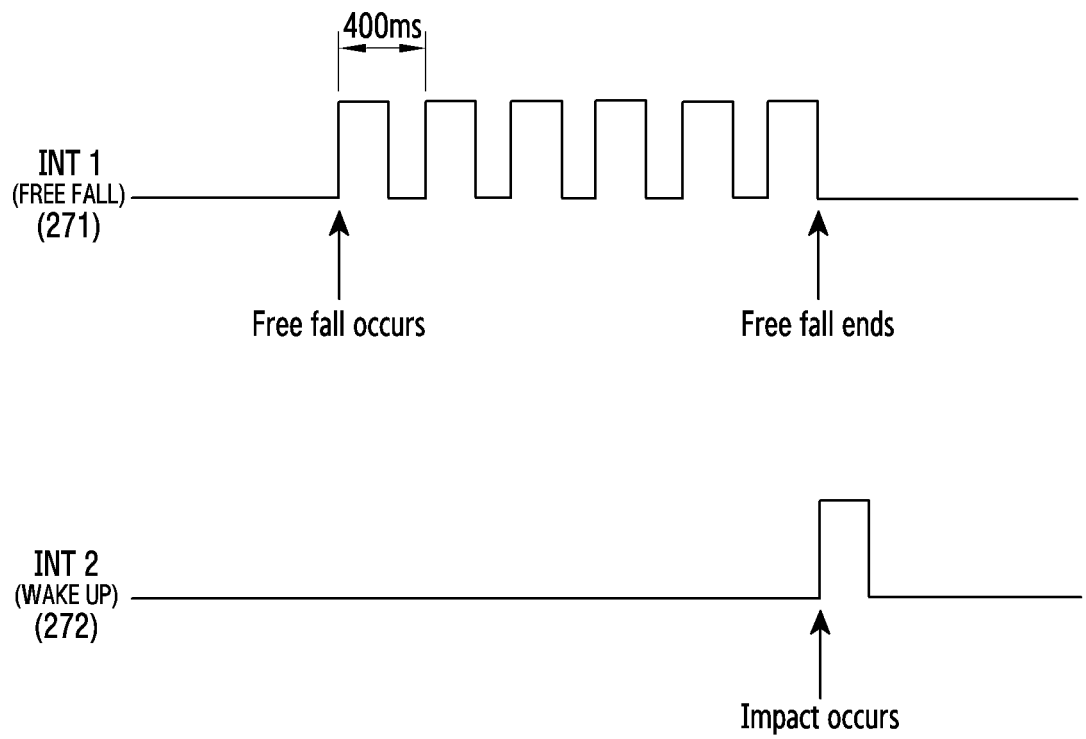
FIG. 2B is a diagram illustrating a timing diagram of a sensor module according to an embodiment of the present invention.

FIG. 2A is a block diagram of an electronic device according to an embodiment of the present invention, and FIG. 2B is a diagram illustrating a timing diagram of a sensor module according to an embodiment of the present invention.

Referring to FIG. 2A and FIG. 2B, an electronic device 201 (e.g., the electronic device 101) according to an embodiment of the present invention may include a processor 221 (e.g., the main processor 121), a memory 230 (e.g., the memory 130) and a sensor module 276 (e.g., the sensor module 176).

The sensor module 276 may detect a state change of the electronic device 201. For example, the sensor module 276 may detect a free fall and/or an impact. The sensor module 276 may be a micro electro-mechanical systems (MEMS) sensor for detecting gravitational acceleration within a first impact range (e.g., −8 g~+8 g).

The sensor module 276 may set a first threshold and a second threshold for the free fall and/or collision detection through registers. The first threshold may be set through a first register as shown in the following Table 1. For example, if the first register of the sensor module 276 is set to "010", the first threshold may be 250 mg. Table 1 is only an example and does not limit the present invention.

TABLE 1

| First register | threshold |
|---|---|
| 000 | 156 mg |
| 001 | 219 mg |
| 010 | 250 mg |
| 011 | 312 mg |
| 100 | 344 mg |
| 101 | 406 mg |
| 110 | 469 mg |
| 111 | 500 mg |

Meanwhile, the second threshold for the impact detection may be a product of 1 LSB and a second register value. Herein, 1 LSB may be a value obtained by dividing a full scale range of the sensor module 276 by 64 mg. The full scale range indicates an output data rate (ORD) of an acceleration sensor and indicates how many data may be sampled for 1 second. The full scale range may be 1.6 Hz~6.66 kHz. The second register has 6 bits, and may have a value of 1 through 63.

The first threshold and the second threshold may be a sum of vector values of three axes (X, Y, and Z axes) of the acceleration sensor.

The sensor module 276 according to an embodiment of the present invention may include at least two interrupt pins 271 and 272. For example, the sensor module 276 may include the first interrupt pin 271 which transmits a first designated signal indicating the free fall occurrence of the electronic device 201 to the processor 221 and the second interrupt pin 272 which transmits a second designated signal indicating the impact occurrence to the processor 221. As shown in FIG. 2B, the sensor module 276 may periodically (e.g., 400 ms) transmit the first designated signal through the first interrupt pin 271 if detecting the free fall. In addition, as shown in FIG. 2B, if the impact occurs at the electronic device 201 (e.g., if it falls to the floor and the free fall is ended), the sensor module 276 may transmit the second designated signal to the processor 221 through the second interrupt pin 272.

The sensor module 276 may include a communication terminal 273 for data communication with the processor 221. For example, the communication terminal 273 may support a synchronization serial communication protocol such as I2C. However, it does not limit embodiments of the present invention.

The processor 221 according to an embodiment of the present invention may recognize the free fall and/or impact occurrence by receiving the first designated signal and/or the second designated signal through the first interrupt pin 271 and/or the second interrupt pin 272 of the sensor module 276.

The processor 221 according to an embodiment of the present invention may recognize state information (e.g., free fall, impact occurrence, fall height information, or floor material), based at least in part on the first designated signal and/or the second designated signal, store the recognized state information in the memory 230, and notify it to a user. The detailed descriptions will be described later with reference to FIG. 6.

Figure 3:
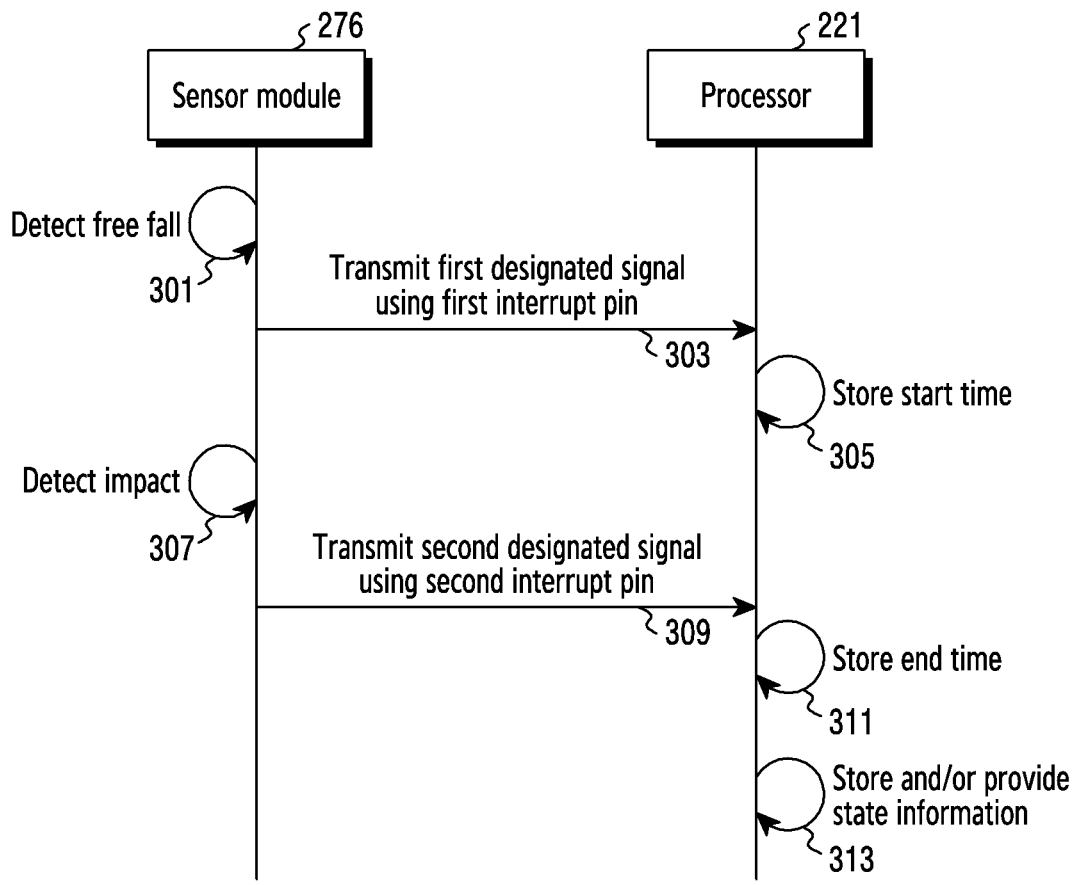
FIG. 3 is a flowchart illustrating operations between a sensor module and a processor according to an embodiment of the present invention.

FIG. 3 is a flowchart illustrating operations between a sensor module and a processor according to an embodiment of the present invention.

Referring to FIG. 3, the sensor module 276 of the electronic device 201 according to an embodiment of the present invention may detect a free fall, in operation 301. For example, the sensor module 276 may recognize the free fall occurrence if the gravitational acceleration is less than or equal to a designated threshold (e.g., 250 mg).

If the free fall is detected, the sensor module 276 may transmit the first designated signal to the processor 221 using the first interrupt pin 271, in operation 303. The first designated signal may be transmitted at a designated period. The processor 221 of the inactive state may wake-up by the first designated signal transmitted through the first interrupt pin 271.

The processor 221 according to an embodiment of the present invention may store a start time of the free fall, in operation 305. For example, the processor 221 may store a time at which the first designated signal is received as the start time of the free fall.

The sensor module 276 according to an embodiment of the present invention may detect an impact, in operation 307. For example, the sensor module 276 may recognize the impact occurrence if the gravitational acceleration is greater than or equal to a designated second threshold (e.g., 1875 mg).

If detecting the impact, the sensor module 276 may transmit the second designated signal to the processor 221 using the second interrupt pin 272, in operation 309.

The processor 221 according to an embodiment of the present invention may store an end time of the free fall, in operation 311. For example, the processor 221 may store the time at which the second designated signal is received as the free fall end time.

The processor 221 according to an embodiment of the present invention may store and/or provide (e.g., notify to the user) state information in operation 313. The state information may be determined based on at least one of the first designated signal and the second designated signal. For example, the state information may be determined based on the start time and the end time. The processor 221 may control a display (e.g., the display device 160) to output a pop-up message informing of the free fall occurrence, height information, and/or an impact level. The detailed description will be described later with reference to FIG. 6.

The electronic device 201 according to an embodiment of the present invention as mentioned above may prevent unnecessary current consumption as the processor 221 does not recognize the free fall and/or impact occurrence by periodically reading the raw data of the sensor module 276, and receives the free fall and/or impact occurrence through the interrupt pins 271 and 272 of the sensor module 276 only if the free fall and/or the impact is detected by the sensor module 276.

Figure 4A:
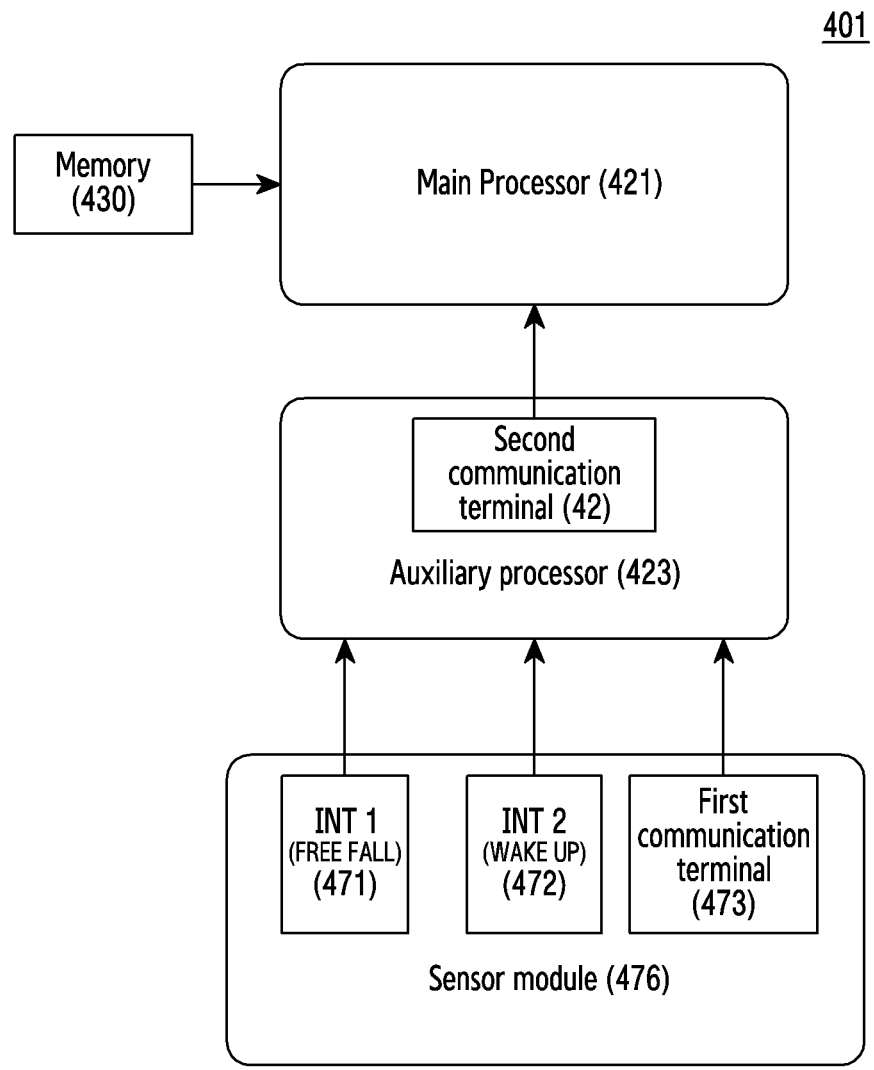
FIG. 4A is a block diagram of an electronic device according to an embodiment of the present invention.
Figure 4B:
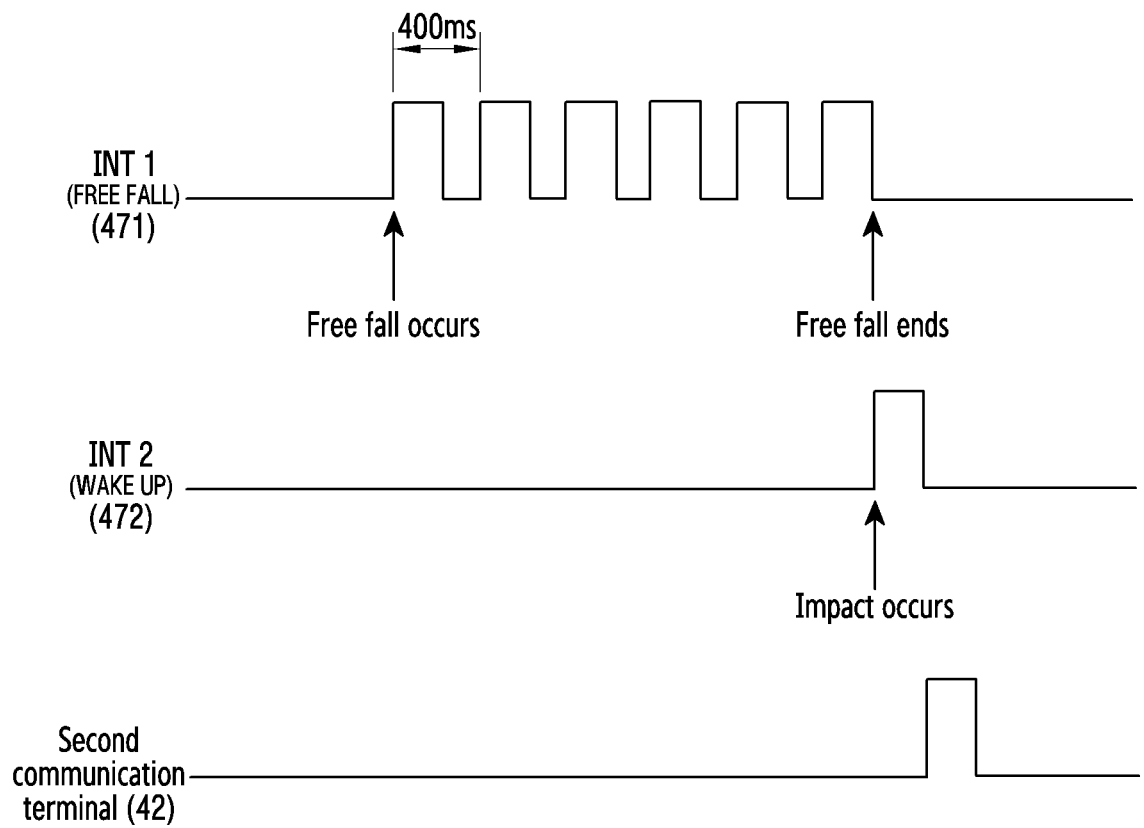
FIG. 4B is a diagram illustrating a timing diagram of a sensor module according to an embodiment of the present invention.

FIG. 4A is a block diagram of an electronic device according to an embodiment of the present invention, and FIG. 4B is a timing diagram of a sensor module according to an embodiment of the present invention.

Referring to FIG. 4A and FIG. 4B, an electronic device 401 (e.g., the electronic device 101) according to an embodiment of the present invention may include a main processor 421 (e.g., the main processor 121), an auxiliary processor 423 (e.g., the auxiliary processor 123), a memory 430 (e.g., the memory 130) and a sensor module 476 (e.g., the sensor module 176).

The sensor module 476 according to an embodiment of the present invention may be operatively connected with the auxiliary processor 423. The auxiliary processor 423 may be a sensor hub processor for controlling the sensor module 476, in lieu of the main processor 421 while the main processor 421 in an inactive (e.g., sleep) state, or together with the main processor 421 while the main processor 421 is in an active (e.g., application running) state. For example, the auxiliary processor 423 may receive the first designated signal and/or the second designated signal through the first interrupt pin 471 and/or the second interrupt pin 472 of the sensor module 473 while the main processor 421 is in the inactive or active state, as shown in FIG. 4B. The auxiliary processor 423 may perform data communication with the sensor module 476 through a first communication terminal 473. For example, the auxiliary processor 423 may receive sensor data (e.g., raw data) through the first communication terminal 473.

The auxiliary processor 423 according to an embodiment of the present invention may recognize state information (e.g., height information) based at least in part on at least one of the first designated signal or the second designated signal received from the sensor module 476. According to an embodiment, the auxiliary processor 423 may transmit the state information to the main processor 421. For example, the auxiliary processor 423 may transmit the state information to the main processor 421 through a second communication terminal 42, as shown in FIG. 4B. The second communication terminal 42 may support, but not limited to, a serial peripheral interface (SPI) communication protocol.

The main processor 421 may receive the state information from the auxiliary processor 423, store it in the memory 430 if necessary, and notify it to the user. The detailed descriptions will be described later with reference to FIG. 6.

Figure 5:
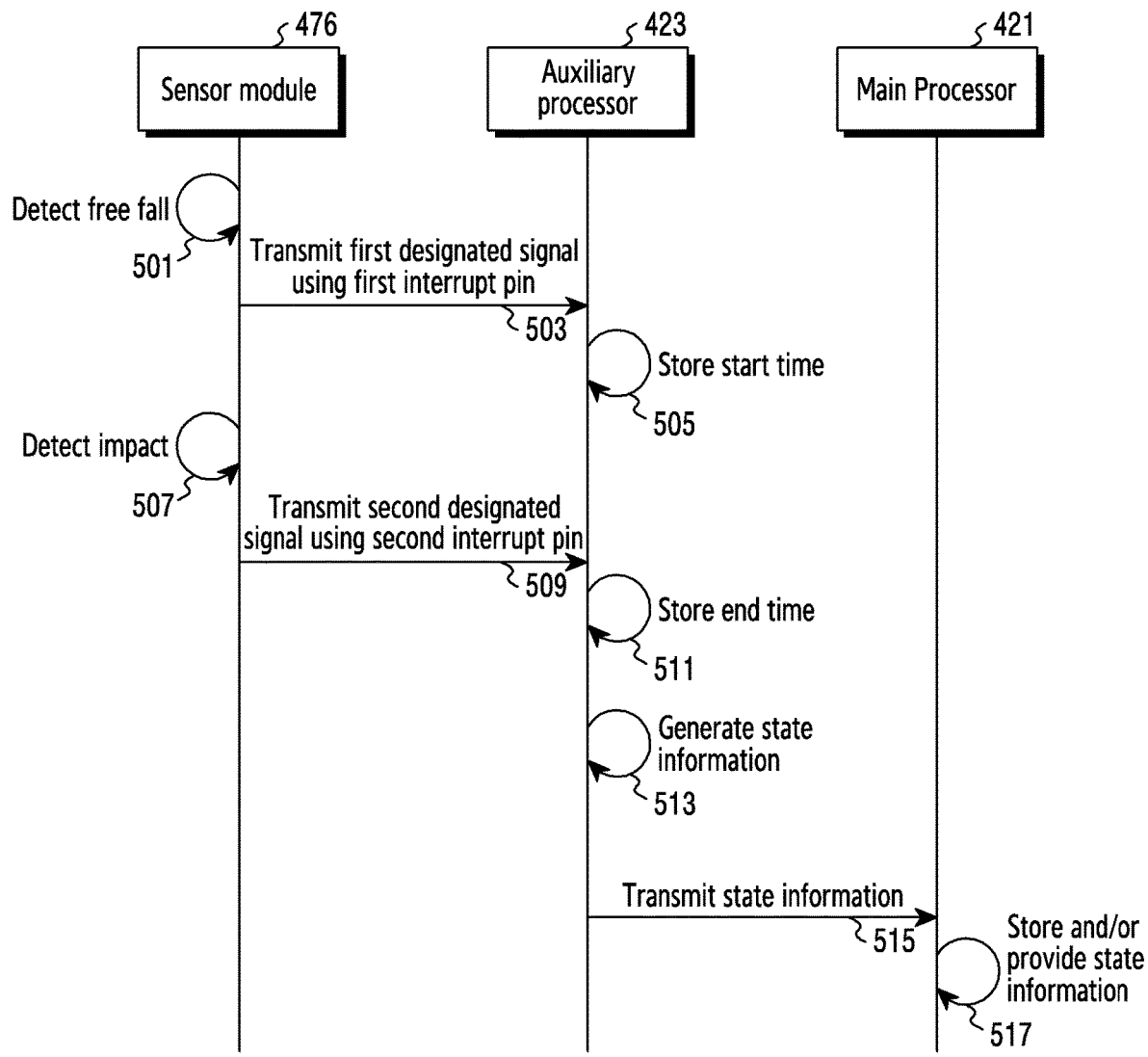
FIG. 5 is a flowchart illustrating operations between a sensor module and a processor according to an embodiment of the present invention.

FIG. 5 is a flowchart illustrating operations between a sensor module and a processor according to an embodiment of the present invention.

Referring to FIG. 5, the sensor module 476 of the electronic device 401 according to an embodiment of the present invention may detect a free fall, in operation 501. For example, the sensor module 476 may recognize the free fall occurrence if the gravitational acceleration is less than or equal to a designated threshold (e.g., 250 mg).

If detecting the free fall, the sensor module 476 may transmit the first designated signal to the auxiliary processor 423 using the first interrupt pin 471, in operation 503. The auxiliary processor 423 of the inactive state may be wake-up by the first designated signal transmitted through the first interrupt pin 471.

The auxiliary processor 423 according to an embodiment of the present invention may store a start time of the free fall, in operation 505. For example, the auxiliary processor 423 may store a time at which the first designated signal is received as the start time of the free fall.

The sensor module 476 according to an embodiment of the present invention may detect an impact, in operation 507. For example, the sensor module 476 may recognize the impact occurrence if the gravitational acceleration is greater than or equal to a designated second threshold (e.g., 1875 mg).

If detecting the impact, the sensor module 476 may transmit the second designated signal to the auxiliary processor 423 using the second interrupt pin 472, in operation 509.

The auxiliary processor 423 according to an embodiment of the present invention may store an end time of the free fall, in operation 511. For example, the auxiliary processor 423 may store the time at which the second designated signal is received as the free fall end time.

The auxiliary processor 423 according to an embodiment of the present invention may generate state information, in operation 513. The state information may be generated based on at least one of the first designated signal and the second designated signal. For example, the state information may be determined based on the start time the end time. The detailed description will be described later with reference to FIG. 6.

The auxiliary processor 423 according to an embodiment of the present invention may transmit the state information to the main processor 421, in operation 515. According to an embodiment, if the main processor 421 is in the inactive state, the auxiliary processor 423 may wake-up the main processor 421 and then transmit the state information.

The main processor 421 receiving the state information may store in the memory 430 and/or provide (e.g., notify to the user) the state information, in operation 517. The main processor 421 may control a display (e.g., the display device 160) to output a pop-up message for notifying the free fall occurrence, height information, and/or an impact level.

The electronic device 401 according to an embodiment of the present invention as described above may recognize the free fall and the impact occurrence by using the auxiliary processor 423 having relatively low current consumption, and if necessary, wake up the main processor 421. The electronic device 401 may reduce an operating frequency of the main processor 421 which consumes considerable current, and thus may further reduce the current consumption than the electronic device 201 of FIG. 2A.

Figure 6:
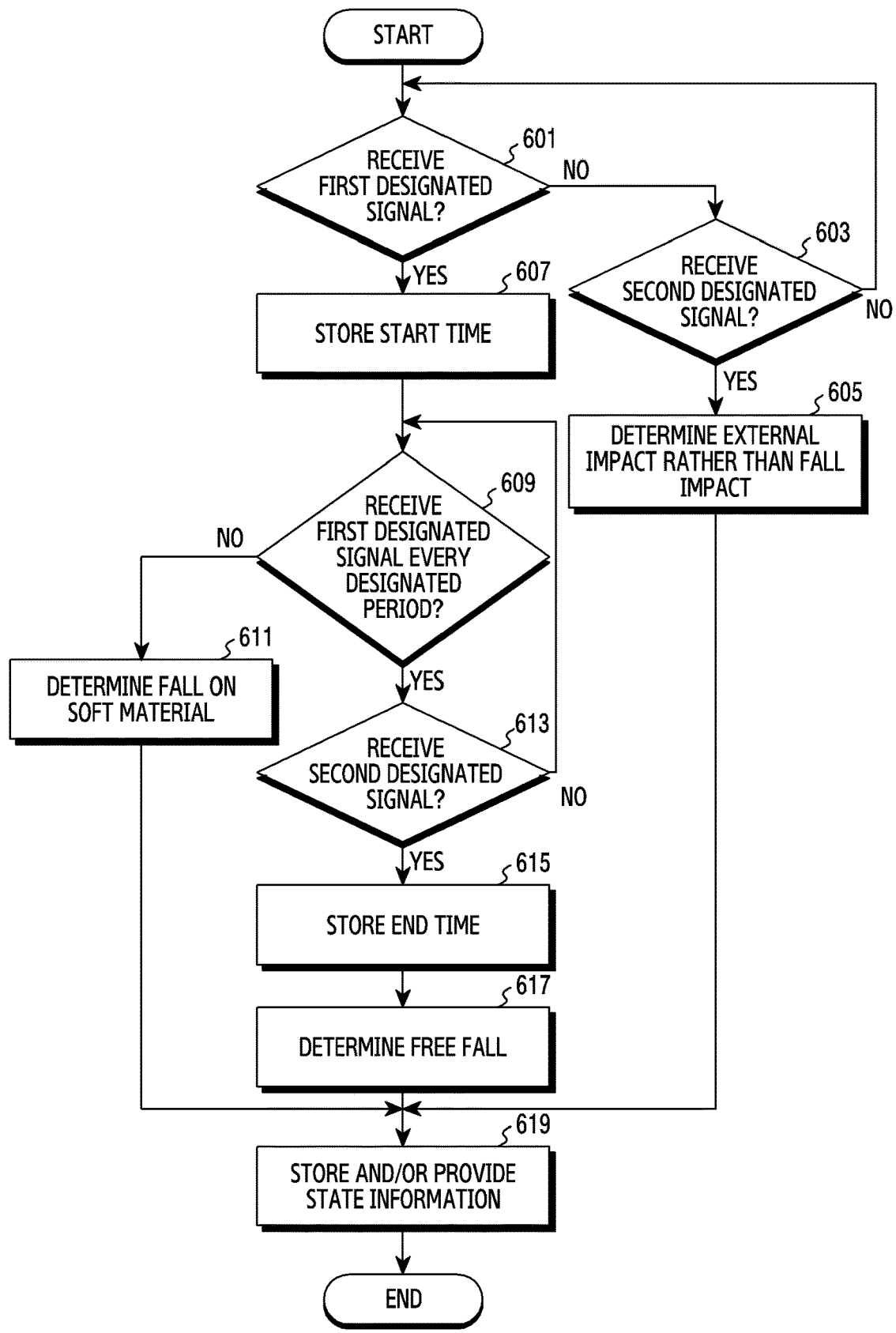
FIG. 6 is a flowchart illustrating a method of sensing a state of an electronic device according to an embodiment of the present invention.

FIG. 6 is a flowchart illustrating a method of sensing a state of an electronic device according to an embodiment of the present invention.

Referring to FIG. 6, a processor (e.g., the processor 120, the processor 221, or the auxiliary processor 423) of an electronic device (e.g., the electronic device 101, the electronic device 201, or the electronic device 401) according to an embodiment of the present invention may identifying whether a first designated signal related to a free fall is received, in operation 601. The first designated signal may be received through a first interrupt pin (e.g., the first interrupt pin 271 or the first interrupt pin 471) or a sensor module (e.g., the sensor module 176, the sensor module 276 or the sensor module 476).

As an identifying result of the operation 601, if the first designated signal is not received, the processor according to an embodiment of the present invention may identify whether a second designated signal related to an impact is received, in operation 603. The second designated signal may be received through a second interrupt pin (e.g., the second interrupt pin 272 or the second interrupt pin 472) of the sensor module.

As an identifying result of the operation 603, if the second designated signal is not received, the processor may return to operation 601. As the identifying result of the operation 603, if the second designated signal is received, the processor may determine that an external impact is occurred, rather than the impact due to the fall, in operation 605. The processor may proceed to operation 619 and store and/or provide state information in a memory (e.g., the memory 130, the memory 230, and the memory 430). For example, the processor may store an occurrence time and/or an impact degree of the external impact in the memory. The processor may control a display (e.g., the display device 160) to output a pop-up message notifying the occurrence and the impact degree of the external impact. The processor may control a speaker (e.g., the sound output device 155) and/or a vibration motor to output a designated effect sound and/or vibrations of a designated pattern together.

As the identifying result of the operation 601, if the first designated signal is received, the processor according to an embodiment of the present invention may store a start time, in operation 607. For example, the processor may store a time at which the first designated signal is received as the start time.

The processor according to an embodiment of the present invention may identify whether the first designated signal is received every designated period (e.g., 400 ms), in operation 609. As an identifying result of the operation 609, if the first designated signal is not received every designated period (e.g., if the first designated signal is not received within the designated period), in operation 611, the processor may determine that an impact less than a second threshold for the impact detection occurs. For example, the processor may determine its fall on an object of a soft material (e.g., cotton) which may absorb shock. The processor may proceed to operation 619 and store and/or provide state information to the memory. For example, the processor may store a free fall occurrence time in the memory. The processor may control a display (e.g., the display device 160) to output a pop-up message notifying the occurrence of the free fall. According to an embodiment, the processor may output a designated notification sound through a speaker (e.g., the sound output device 155) or vibrate a vibration motor (not shown) in a designated pattern. This is to prevent the user from moving to another place and losing the electronic device without recognizing the fall of the electronic device. According to an embodiment, the processor may measure ambient light through an illuminance sensor, turn on the display if it is below a designated illuminance, or blinker a light emitted diode (LED) (e.g., a flash of the camera). This is to enable the user to easily discover the electronic device.

As the identifying result of the operation 609, if the first designated signal is received at the designated period, the processor may identify whether a second designated signal is received, in operation 613. If the second designated signal is not received as an identifying result of the operation 613, the processor may return to operation 609. By contrast, if the second designated signal is received as the identifying result of the operation 613, the processor may store an end time, in operation 615. For example, the processor may store a time at which the second designated signal is received as the end time.

The processor storing the end time may determine free fall occurrence, in operation 617. In operation 619, the processor may store and/or provide state information in a memory. For example, the processor may generate height information of the free fall using the start time and the end time, and store the free fall occurrence time, the impact level and/or the height information due to the free fall in the memory. The processor may control the display to output a pop-up message notifying the free fall occurrence, the impact level and/or height due to the free fall. The processor may control to output a designated sound effect and/or vibrations of a designated pattern together.

Figure 7:
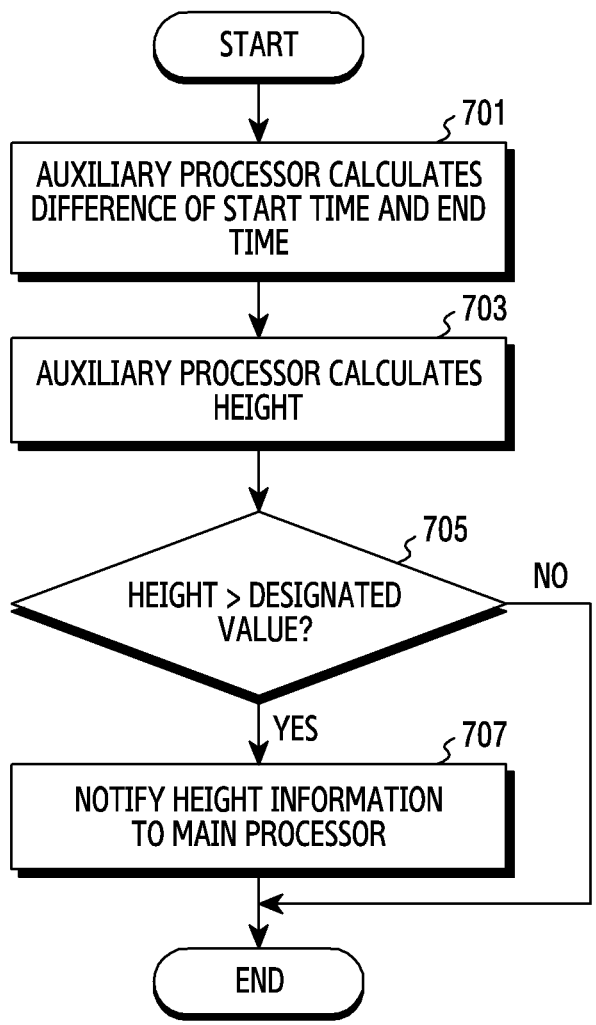
FIG. 7 is a flowchart illustrating a method of providing height information of an electronic device according to an embodiment of the present invention.

FIG. 7 is a flowchart illustrating a method of providing height information of an electronic device according to an embodiment of the present invention.

Referring to FIG. 7, an auxiliary processor (e.g., the auxiliary processor 123, or the auxiliary processor 423) of an electronic device (e.g., the electronic device 101, the electronic device 201, or the electronic device 401) according to an embodiment of the present invention may calculate a difference between a start time and an end time, in operation 701.

The auxiliary processor according to an embodiment of the present invention may calculate a height, in operation 703. For example, the auxiliary processor may calculate the height using the following Equation 1.

$$h = \frac{1}{2}gt^2 \qquad \text{Equation 1}$$

In Equation 1, "h" denotes the height, g denotes the gravitational acceleration 9.8 m/s$^2$, and "t" denotes the difference of the start time and the end time.

The auxiliary processor according to an embodiment of the present invention may identify whether the calculated height exceeds (or equal to or greater than) a designated value, in operation 705. If the calculated height is equal to or less than (or falls below) the designated value as an identifying result of the operation 705, the auxiliary processor may stop providing the height information. According to an embodiment, the auxiliary processor may temporarily store the height information, and if a main processor (e.g., the main processor 121 or the main processor 421) is inactive (or wakes up) by other event, may transmit the height information the main processor to store in the memory.

By contrast, if the calculated height exceeds (or is equal to or greater than) the designated value as the identifying result of the operation 705, the auxiliary processor may transmit the height information to the main processor, in operation 707.

According to some embodiment, if the main processor is active, the calculated height information may be directly transmitted to the main processor, and if the main processor is inactive, the calculated height information may be transmitted to the main processor only if the calculated height information exceeds the designated value. This is to prevent the current consumption by lowering the frequency at which the main processor wakes up.

Figure 8A:
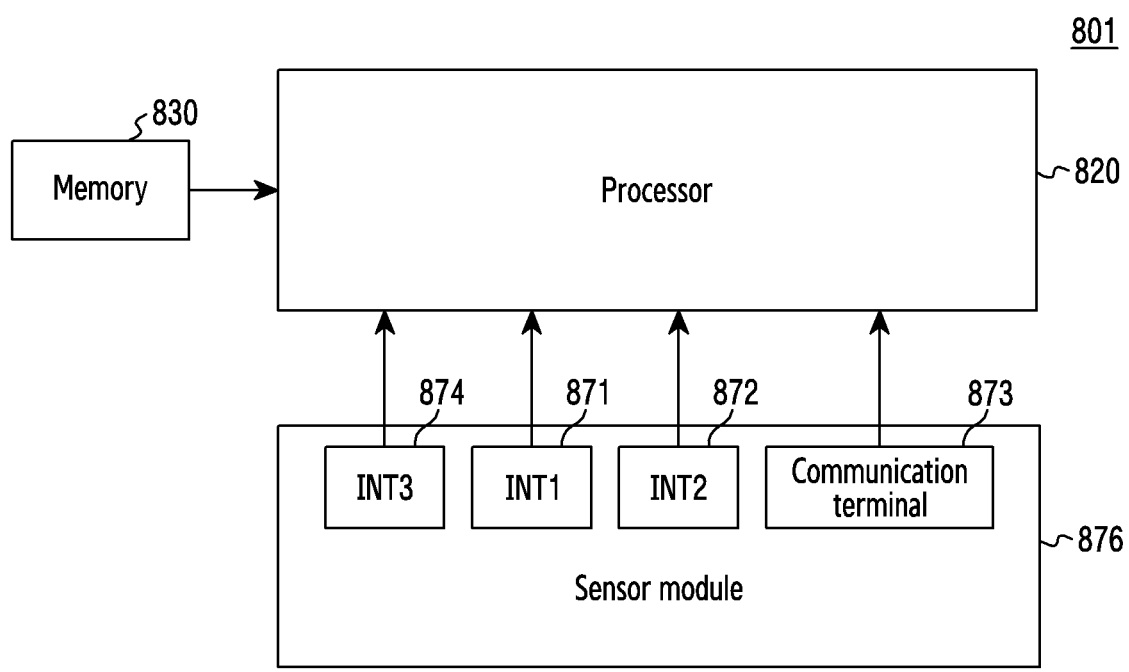
FIG. 8A is a block diagram of an electronic device according to an embodiment of the present invention.

FIG. 8A is a block diagram of an electronic device according to an embodiment of the present invention.

Referring to FIG. 8A, an electronic device 801 (e.g., the electronic device 101) according to an embodiment of the present invention may include a processor 820 (e.g., the main processor 121), and a memory 830 (e.g., the memory 130) and a sensor module 876 (e.g., the sensor module 176).

The sensor module 876 according to an embodiment of the present invention may include three interrupt terminals 871, 872 and 874. For example, the first interrupt pin 871 and the second interrupt pin 872 may be the same as the first interrupt pins 271 and 471 and the second interrupt pins 272 and 472 of FIG. 2A through FIG. 5. The third interrupt pin 874 may transmit a third designated signal notifying a tilt to the processor 820 if a free fall of the electronic device 801 occurs.

The processor 820 may determine that the electronic device 801 rotates in the free fall and which posture it falls in through the third designated signal. In addition, the processor 820 may recognize an impact (or collision) location of the electronic device, based on information related to the posture. According to an embodiment, the processor 820 may read raw data of the sensor module 876 through a communication terminal 873 to obtain a more accurate situation upon detecting the free fall.

Figure 8B:
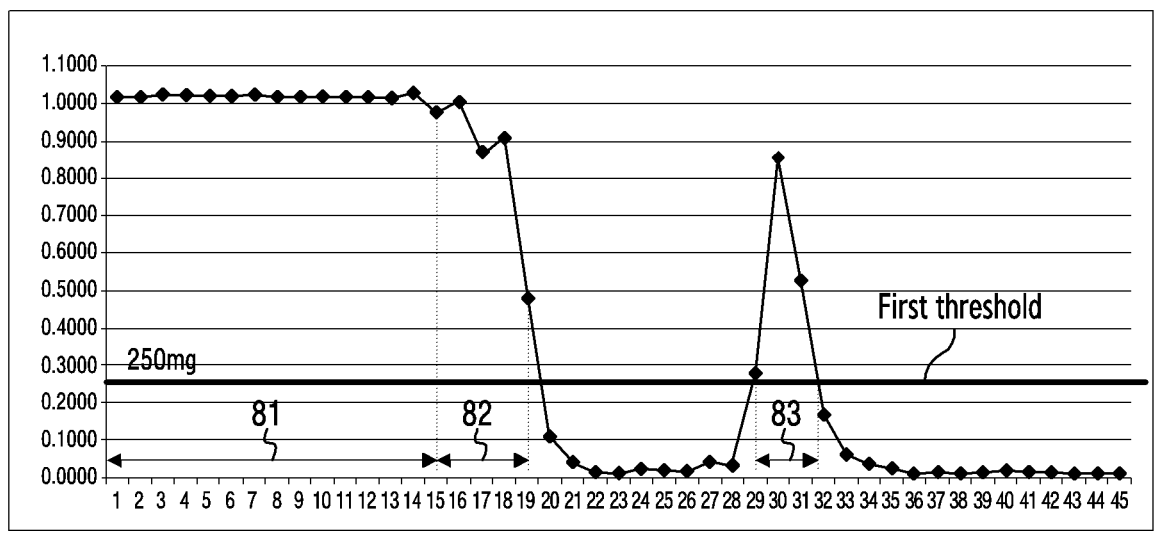
FIG. 8B is a graph illustrating gravitational acceleration value changes measured by a sensor module during free fall according to an embodiment of the present invention.

FIG. 8B is a graph illustrating gravitational acceleration value changes measured at the sensor module during the free fall according to an embodiment of the present invention.

Referring to FIG. 8B, the gravitational acceleration value of the sensor module 876 according to an embodiment of the present invention may be 1 g before the free fall (e.g., a first section 81 of FIG. 8B), and may gradually decrease if the free fall starts, as shown in a second section 82 of FIG. 8B. If the gravitational acceleration value gradually decreases and reaches a first threshold value (e.g., 250 mg), the sensor module 876 may determine that the free fall occurs.

The gravitational acceleration value of the sensor module 876 may have an abnormal peak even during the free fall, as shown in a third section 83 of FIG. 8B. The abnormal peak may be generated by the rotation of the electronic device 801. Due to the abnormal peak, the sensor module 876 may not accurately detect the free fall. This is because it may not recognize the abnormal peak due to the rotation of the electronic device if detecting only the free fall using the first interrupt terminal as in the electronic device 201 of FIG. 2A and the electronic device 401 of FIG. 4A.

The following Table 2 shows experimental data of the height measured in detecting only the free fall and in detecting the free fall and the rotation together.

TABLE 2

| condition | fall height (cm) | 60 first | 60 second | 100 first | 100 second | 180 first | 180 second |
|---|---|---|---|---|---|---|---|
| one interrupt terminal | #1 | 65 | 43 | 76 | 79 | 152 | 154 |
| | #2 | 59 | 41 | 80 | 81 | 156 | 156 |
| | #3 | 42 | 39 | 73 | 75 | 154 | 148 |
| | #4 | 44 | 55 | 78 | 80 | 155 | 156 |
| | #5 | 41 | 40 | 77 | 116 | 145 | 153 |
| | #6 | 61 | 44 | 80 | 81 | 155 | 154 |
| | #7 | 43 | 43 | 100 | 78 | 153 | 151 |
| | #8 | 44 | 45 | 79 | 79 | 153 | 155 |
| | #9 | 55 | 55 | 91 | 92 | 148 | 153 |
| | #10 | 39 | 39 | 91 | 78 | 148 | 151 |
| | Maximum error | 21 | | 27 | | 35 | |
| two interrupt terminals | #1 | 52 | 54 | 97 | 97 | 181 | 180 |
| | #2 | 60 | 58 | 94 | 93 | 176 | 178 |
| | #3 | 59 | 55 | 96 | 96 | 180 | 171 |
| | #4 | 57 | 53 | 94 | 94 | 177 | 179 |
| | #5 | 55 | 53 | 96 | 96 | 178 | 180 |
| | #6 | 54 | 54 | 94 | 94 | 173 | 175 |
| | #7 | 54 | 53 | 96 | 96 | 180 | 180 |
| | #8 | 54 | 54 | 93 | 93 | 171 | 172 |
| | #9 | 57 | 56 | 98 | 98 | 178 | 178 |
| | Maximum error | 7 | | 7 | | 9 | |

Referring to Table 2, the error is improved from about 30 cm to about 8 cm if the free fall and the rotation are detected together. This is because the error due to the abnormal peak such as the third section 83 of FIG. 8B may be removed through the rotation detection.

Figure 9:
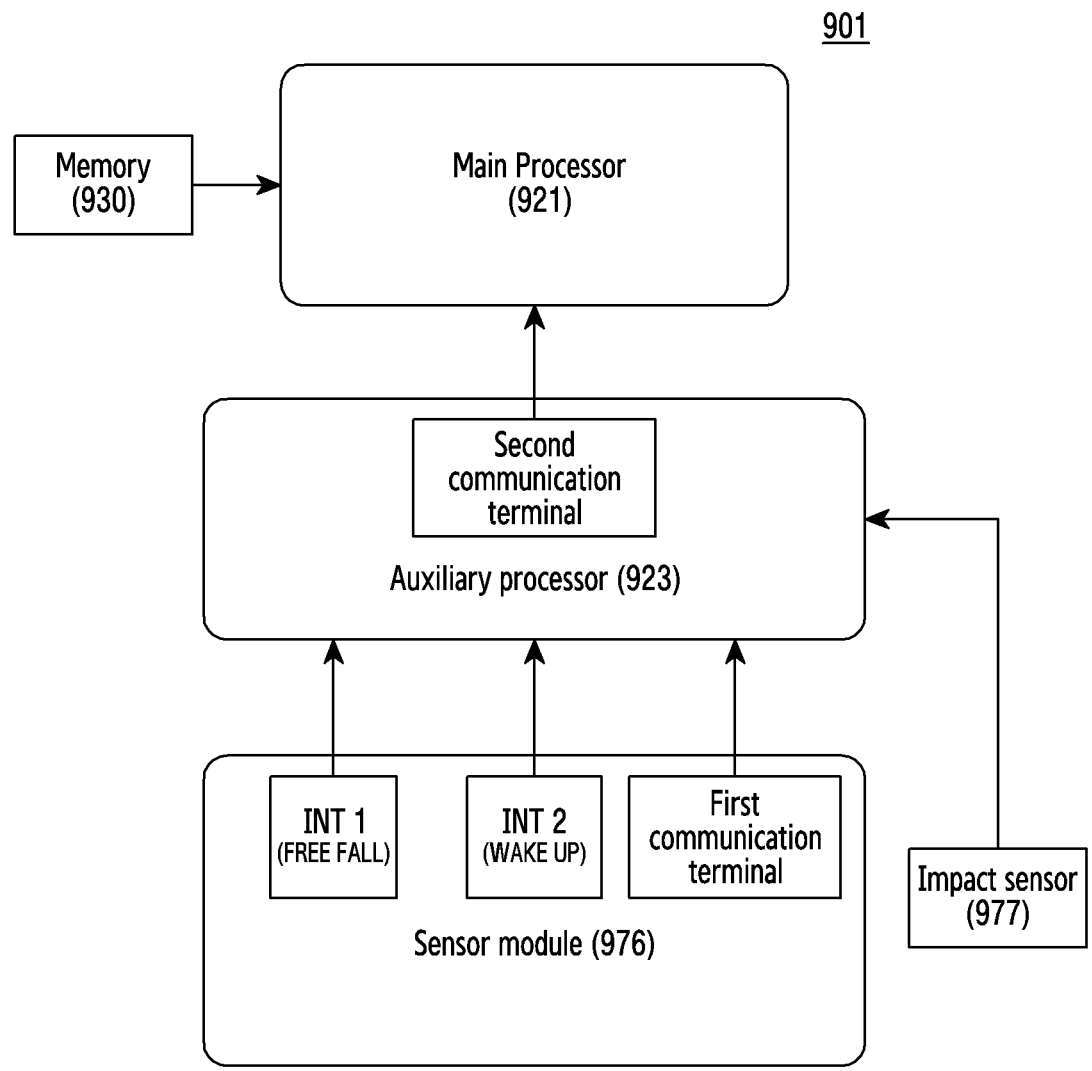
FIG. 9 is a block diagram of an electronic device according to an embodiment of the present invention.

FIG. 9 is a block diagram of an electronic device according to an embodiment of the present invention.

Referring to FIG. 9, an electronic device 901 (e.g., the electronic device 101) according to various embodiments of the present invention may include a main processor 921 (e.g., the main processor 121), an auxiliary processor 923 (e.g., the auxiliary processor 123), a memory 930 (e.g., the memory 130), a sensor module 976 (e.g., the sensor module 176) and an impact sensor 997.

The electronic device 901 is similar to the electronic device 401 of FIG. 4A, but may further include the impact sensor 997 for detecting an impact level undetectable by the sensor module 976. For example, the impact sensor 997 may be a high-performance impact sensor for detecting an impact of a second impact range (−16 g~+16 g or −32 g~+32 g) greater than a first impact range (e.g., −8 g~+8 g) detectable by the sensor module 976. The impact sensor 997 may transmit a fourth designated signal to the auxiliary processor 923 through an interrupt pin if detecting the impact.

The impact sensor 977 may be activated if the free fall is detected to measure the impact level according to the free fall more accurately and in the wide range.

Figure 10:
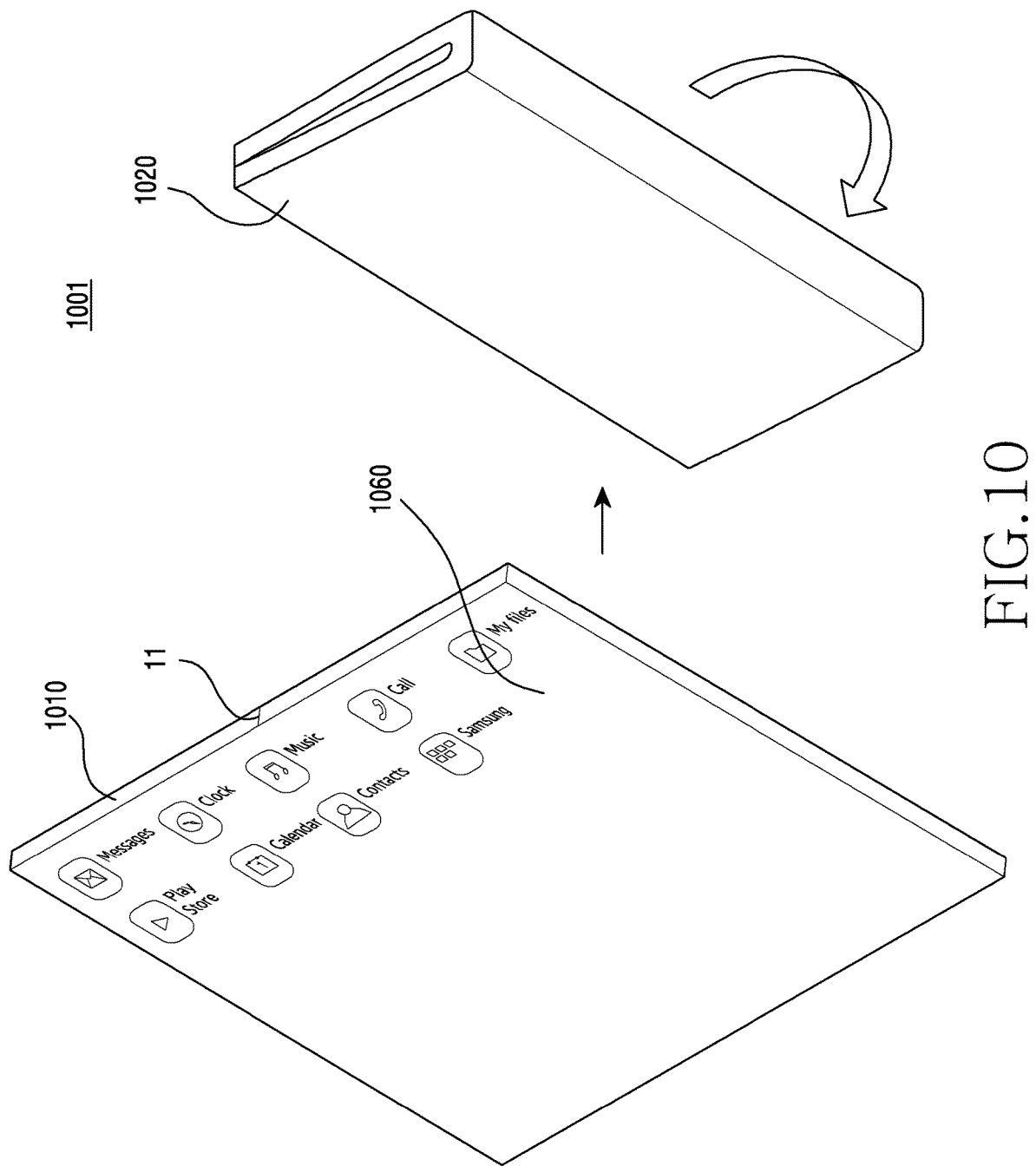
FIG. 10 is a diagram illustrating an electronic device according to an embodiment of the present invention.
Figure 11:
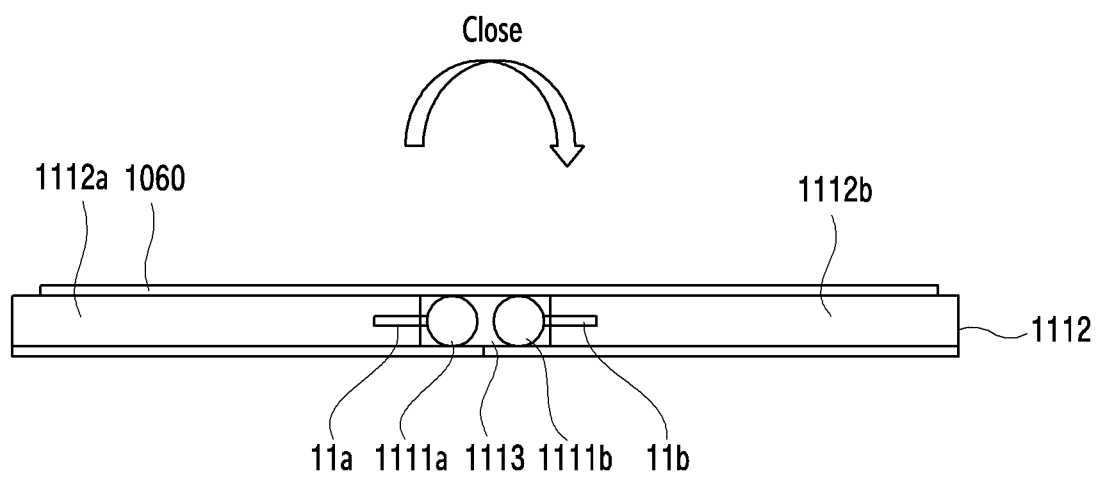
FIG. 11 is a diagram illustrating a folding structure of an electronic device according to an embodiment of the present invention.

FIG. 10 is a diagram illustrating an electronic device according to an embodiment of the present invention, and FIG. 11 is a diagram illustrating a folding structure of an electronic device according to an embodiment of the present invention.

Referring to FIG. 10 and FIG. 11, an electronic device 1001 (e.g., the electronic device 101) according to an embodiment of the present invention includes a foldable display (or a flexible display) 1060, and may be folded based on at least one axis. For example, the electronic device 1001 may be folded based on a center point 11 of a horizontal direction. This is only an example, and does not limit an embodiment of the present invention. According to some embodiment, the electronic device 1001 may be folded at two points (e.g., a ⅓ point and a ⅔ point of the horizontal direction) of the horizontal direction. Alternatively, the electronic device 1001 may be folded at at least one point of a vertical direction.

The electronic device 1001 according to an embodiment of the present invention may be automatically changed to a folding state 1020 if detecting a fall (e.g., a free fall) in an unfolded state 1010. For example, if the electronic device 1001 falls, a sensor module (e.g., the sensor module 176, the sensor module 276, the sensor module 476, the sensor module 876, or the sensor module 976) of the electronic device 1001 may detect the fall, and transmit the first designated signal to a processor (e.g., the processor 120, the processor 221, the main processor 421, the processor 820, or the main processor 921) (or an auxiliary processor (e.g., the auxiliary processor 423, the auxiliary processor 923)) through a first interrupt pin (e.g., the first interrupt pin 271, the first interrupt pin 471, or the first interrupt pin 871). If the processor of the electronic device 1001 may, if determining that the fall is maintained over a designated time (e.g., 0.5 seconds), control a first folding module 1111*a* and a second folding module 1111*b* included in the electronic device 1001 to fold the electronic device 1001.

The first folding module 1111*a* and the second folding module 1111*b* may be actuators for folding the electronic device 1001. For example, the first folding module 1111*a* and the second folding module 1111*b* may be motors. The first folding module 1111*a* and the second folding module 1111*b* may be included in a hinge 1113. The first folding module 1111*a* may, under control of the processor (or the auxiliary processor), fold the electronic device 1001, by transmitting a force of a close direction to an arm 11*a* connected with a first portion 1112*a* to rotate the first portion 1112*a* of a housing 1112 to a second portion 1112*b*. Similarly, the second folding module 1111*b* may, under control of the processor (or the auxiliary processor), fold the electronic device 1001, by transmitting the force of the close direction to an arm 11*b* connected with the second portion 1112*b* to rotate the second portion 1112*b* of the housing 1112 toward the first portion 1112*a*.

According to some embodiment, if receiving the first designated signal according to the free fall detection through the first interrupt pin from the sensor module, the processor (or the auxiliary processor) of the electronic device 1001 may identify the state (e.g., folding or unfolding) of the electronic device 1001, and control the first folding module 1111*a* and the second folding module 1111*b* to fold the electronic device 1001 in the unfolding state.

The electronic device 1001 according to an embodiment of the present invention described above may be automatically folded upon detecting the fall, and thus protect a display 1060 from the impact. For example, the electronic device 1001 may be completely folded not to the display 1060 to outside, or may, even if it is not completely folded, protect the display 1060 from directly hitting an external object (e.g., the ground) thus prevent damage of the display 1060.

According to various embodiments of the present invention, an electronic device (e.g., the electronic device 101, the electronic device 201, the electronic device 401, the electronic device 801, the electronic device 901, and the electronic device 1001) may comprise a processor (e.g., the processor 120, the processor 221, the main processor 421, the auxiliary processor 423, the processor 820, the main processor 921, the auxiliary processor 923); and a sensor (e.g., the sensor module 176, the sensor module 276, the sensor module 476, the sensor module 876, the sensor module 976) comprising a first interrupt pin (e.g., the first interrupt pin 271, the first interrupt pin 471, or the first interrupt pin 871) and a second interrupt pin (e.g., the second interrupt pin 272, the second interrupt pin 472, or the second interrupt pin 872) operatively connected with the processor, and configured to detect a movement of the electronic device. The sensor may be configured to transmit, when detecting a free fall of the electronic device, a first designated signal to the processor using the first interrupt pin, and transmit, when detecting an impact state of the electronic device, a second designated signal to the processor using the second interrupt pin.

According to various embodiments, the processor may be configured to determine a state of the electronic device based on at least one of the first designated signal and the second designated signal.

According to various embodiments, the processor may be configured to notify information related to the state to a user.

According to various embodiments, the electronic device may further comprise a memory (e.g., the memory 130, the memory 230, the memory 430, the memory 830, the memory 930) for storing the information related to the situation.

According to various embodiments, the processor may be an application processor.

According to various embodiments, the processor may comprise an auxiliary processor operatively connected with the sensor, and a main processor operatively connected with the auxiliary processor.

According to various embodiments, the auxiliary processor may configure to calculate a height based on a difference between a start time of the free fall at which the first designated signal is initially received and an end time at which the second designated signal is received, and transmit the calculated height to the main processor when the calculated height satisfies a designated condition.

According to various embodiments, the sensor may further comprise a third interrupt pin (e.g., the third interrupt pin 874) for transmitting a third designated signal to the processor when detecting a rotation of the electronic device.

According to various embodiments, the sensor may be configured with a first threshold for detecting the free fall of the electronic device and a second threshold for determining whether an impact occurs.

According to various embodiments, the processor may be configured to perform, when the second designated signal is not received even after a designated time elapses after receiving the first designated signal, at least one of designated sound effect outputting, activating a display, vibration outputting, or activating a light emitting diode.

According to various embodiments of the present invention, an electronic device (e.g., the electronic device 101, the electronic device 201, the electronic device 401, the electronic device 801, the electronic device 901, and the electronic device 1001) may include a memory (e.g., the memory 130, the memory 230, the memory 430, the memory 830, the memory 930); a sensor (e.g., the sensor module 176, the sensor module 276, the sensor module 476, the sensor module 876, the sensor module 976) including a first interrupt pin (e.g., the first interrupt pin 271, the first interrupt pin 471, or the first interrupt pin 871) and a second interrupt pin (e.g., the second interrupt pin 272, the second interrupt pin 472, or the second interrupt pin 872); and at least one processor (e.g., the processor 120, the processor 221, the main processor 421, the auxiliary processor 423, the processor 820, the main processor 921, the auxiliary processor 923) operatively connected to the memory and the sensor. The at least one processor may be configured to receive at least one of a first designated signal indicating a free fall of the electronic device through the first interrupt pin or a second designated signal indicating an impact of the electronic device through the second interrupt pin, determine a state of the electronic device based on at least one of the first designated signal and the second designated signal, and perform at least one of storing information related to the determined state in the memory or notifying to a user.

According to various embodiments, the processor may include an auxiliary processor operatively connected to the sensor; and a main processor operatively connected to the auxiliary processor.

According to various embodiments, the auxiliary processor may be configured calculate a height based on a difference between a start time of the free fall at which the first designated signal is initially received and an end time at which the second designated signal is received, and when the calculated height satisfies a designated condition, transmit the calculated height to the main processor.

According to various embodiments, the sensor may further include a third interrupt pin (e.g., the third interrupt pin 874) for transmitting a third designated signal to the processor when detecting a rotation of the electronic device.

According to various embodiments, the processor may be configured to perform, when the second designated signal is not received even after a designated time elapses after receiving the first designated signal, at least one of designated sound effect outputting, activating a display, vibration outputting, or activating a light emitting diode.

According to various embodiments, the sensor may detect a free fall when a gravitational acceleration is greater than or equal to a set first threshold, and detect a collision when the gravitational acceleration is greater than or equal to a second threshold.

According to various embodiments of the present invention, an electronic device (e.g., the electronic device 101, the electronic device 201, the electronic device 401, the electronic device 801, the electronic device 901, and the electronic device 1001) may include a first sensor (e.g., the sensor module 176, the sensor module 276, the sensor module 476, the sensor module 876, the sensor module 976) including a first interrupt pin (e.g., the first interrupt pin 271, the first interrupt pin 471, or the first interrupt pin 871) and a second interrupt pin (e.g., the second interrupt pin 272, the second interrupt pin 472, or the second interrupt pin 872); a second sensor (e.g., the impact sensor 977); and at least one processor (e.g., the processor 120, the processor 221, the main processor 421, the auxiliary processor 423, the processor 820, the main processor 921, the auxiliary processor 923) operatively connected to the first sensor and the second sensor. The at least one processor may be configured to receive at least one of a first designated signal indicating a free fall of the electronic device through the first interrupt pin or a second designated signal indicating an impact within a first impact range through the second interrupt pin, and receive a fourth designated signal indicating an impact within a second impact range which is greater than the first impact range through the second interrupt pin.

According to various embodiments, the processor may be configured to determine a state of the electronic device based on at least one of the first designated signal, the second designated signal or the fourth designated signal, and to perform at least one storing or providing information related to the determined state.

According to various embodiments, the first sensor may further include a third interrupt pin (e.g., the third interrupt pin 874) for transmitting a third designated signal to the processor when detecting a rotation of the electronic device.

According to various embodiments, the processor may include an auxiliary processor operatively connected to the first sensor and the second sensor; and a main processor operatively connected to the auxiliary processor.

According to various embodiments of the present invention, a method for detecting a state of an electronic device (e.g., the electronic device 101, the electronic device 201, the electronic device 401, the electronic device 801, the electronic device 901, and the electronic device 1001) which comprises a sensor (e.g., the sensor module 176, the sensor module 276, the sensor module 476, the sensor module 876, the sensor module 976) comprising a first interrupt pin (e.g., the first interrupt pin 271, the first interrupt pin 471, or the first interrupt pin 871) and a second interrupt pin (e.g., the second interrupt pin 272, the second interrupt pin 472, or the second interrupt pin 872) may comprise: receiving at least one of a first designated signal indicating a free fall of the electronic device through the first interrupt pin or a second designated signal indicating an impact of the electronic device through the second interrupt pin; determining the state of the electronic device based on at least one of the received first designated signal and the received second designated signal; and performing at least one of storing information related to the determined state in a memory (e.g., the memory 130, the memory 230, the memory 430, the memory 830, the memory 930) of the electronic device or notifying to a user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the document, the electronic devices are not limited to those described above.

It should be appreciated that various embodiments of the present document and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the document may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a processor; and
   a sensor comprising a first interrupt pin and a second interrupt pin operatively connected with the processor, and configured to detect a movement of the electronic device,
   wherein the sensor is configured to:
      when detecting a free fall of the electronic device, transmit a first designated signal to the processor using the first interrupt pin, and
      when detecting an impact state of the electronic device, transmit a second designated signal to the processor using the second interrupt pin.

2. The electronic device of claim 1, wherein the processor is further configured to:
   determine a state of the electronic device based on at least one of the first designated signal and the second designated signal.

3. The electronic device of claim 2, wherein the processor is further configured to:
   notify information related to the state to a user.

4. The electronic device of claim 3, further comprising:
   a memory for storing the information related to a situation.

5. The electronic device of claim 1, wherein the processor is an application processor.

6. The electronic device of claim 1, wherein the processor comprises:
   an auxiliary processor operatively connected with the sensor; and
   a main processor operatively connected with the auxiliary processor.

7. The electronic device of claim 6, wherein the auxiliary processor is configured to:
   calculate a height based on a difference between a start time of the free fall at which the first designated signal is initially received and an end time at which the second designated signal is received, and
   transmit the calculated height to the main processor when the calculated height satisfies a designated condition.

8. The electronic device of claim 1, wherein the sensor further comprises:
   a third interrupt pin for transmitting a third designated signal to the processor when detecting a rotation of the electronic device.

9. The electronic device of claim 1, wherein the sensor is configured with a first threshold for detecting the free fall of the electronic device and a second threshold for determining whether an impact occurs.

10. The electronic device of claim 1, wherein the processor is further configured to:
    when the second designated signal is not received even after a designated time elapses after receiving the first designated signal, perform at least one of designated sound effect outputting, activating a display, vibration outputting, or activating a light emitting diode.

11. The electronic device of claim 1, wherein the sensor detects an impact within a first impact range, and further comprises:
    another sensor for transmitting a fourth designated signal to the processor when detecting an impact within a second impact range which is greater than the first impact range.

12. The electronic device of claim 11, wherein the processor is further configured to:
    determine a state of the electronic device based on at least one of the first designated signal, the second designated signal or the fourth designated signals, and
    perform at least one of storing or providing information of the determined state.

13. The electronic device of claim 11, wherein the sensor further comprises:
    a third interrupt pin for transmitting a third designated signal to the processor when detecting a rotation of the electronic device.

14. The electronic device of claim 11, wherein the processor comprises:
    an auxiliary processor operatively connected to the sensor and the another sensor; and a main processor operatively connected to the auxiliary processor.

15. A method for detecting a state of an electronic device which comprises a sensor comprising a first interrupt pin and a second interrupt pin, comprising:

receiving, by a processor, at least one of a first designated signal indicating a free fall of the electronic device through the first interrupt pin or a second designated signal indicating an impact of the electronic device through the second interrupt pin;

determining, by the processor, the state of the electronic device based on at least one of the received first designated signal and the received second designated signal; and performing, by the processor, at least one of storing information related to the determined state in a memory of the electronic device or notifying to a user.

16. The method of claim 15, wherein the processor comprises:

an auxiliary processor operatively connected with the sensor; and a main processor operatively connected with the auxiliary processor.

17. The method of claim 16, further comprising:

calculating, by the auxiliary processor, a height based on a difference between a start time of the free fall at which the first designated signal is initially received and an end time at which the second designated signal is received; and transmit, by the auxiliary processor, the calculated height to the main processor when the calculated height satisfies a designated condition.

18. The method of claim 15, wherein the sensor further comprises a third interrupt pin, and the method further comprises receiving, by the processor, a third designated signal through the third interrupt pin when detecting a rotation of the electronic device.

19. The method of claim 15, further comprising:

detecting, by the sensor, the free fall of the electronic device when a gravitational acceleration is greater than or equal to a set first threshold; and detecting, by the sensor, a collision of the electronic device when the gravitational acceleration is greater than or equal to a set second threshold.

20. The method of claim 15, further comprising:

performing, when the second designated signal is not received even after a designated time elapses after receiving the first designated signal, at least one of designated sound effect outputting, activating a display, vibration outputting, or activating a light emitting diode.

* * * * *